Dec. 9, 1952  M. WATTER  2,620,742
RAILWAY TRUCK
Filed April 24, 1947  5 Sheets-Sheet 1
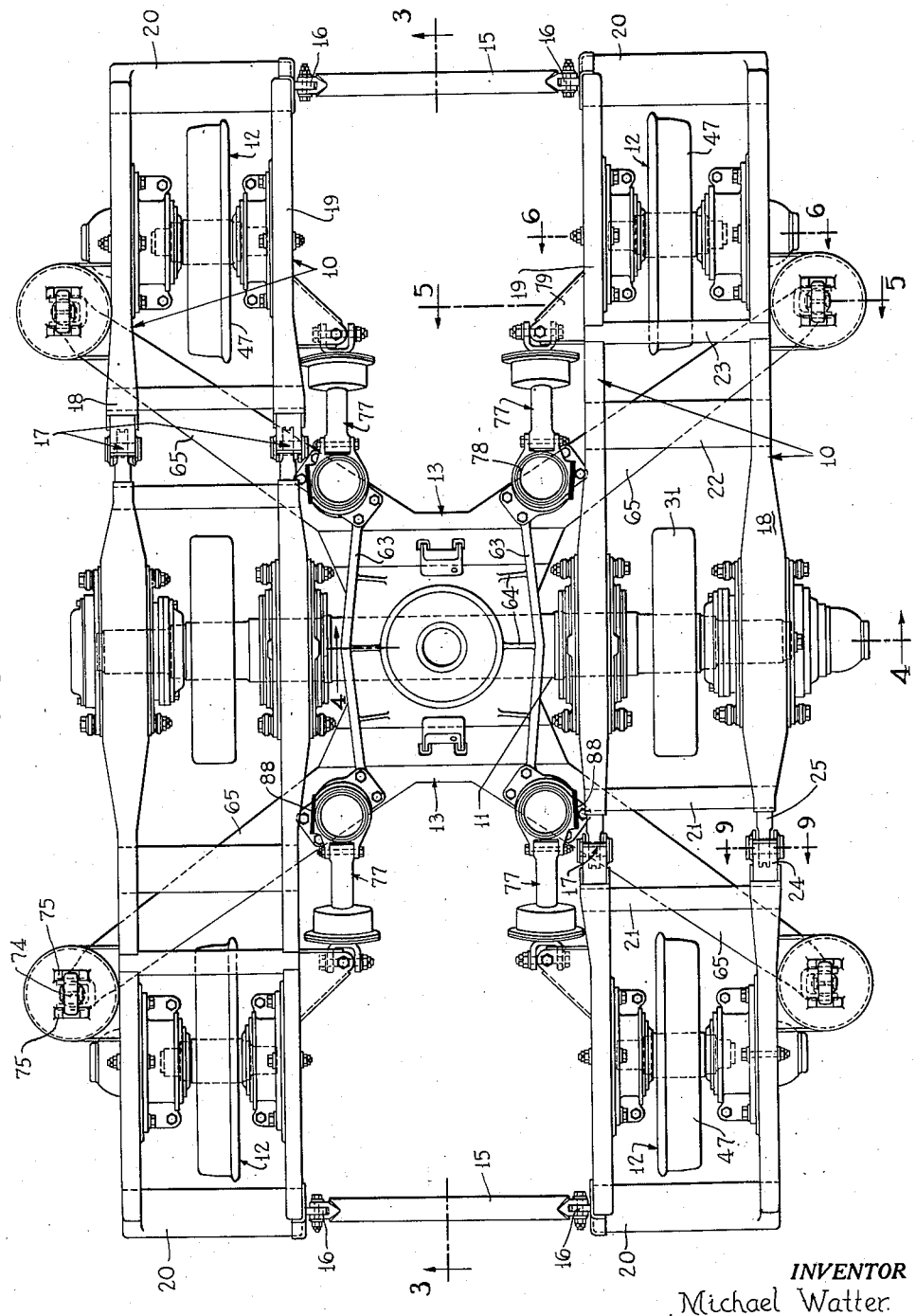
INVENTOR
Michael Watter.
BY Maurice A. Crews
ATTORNEY

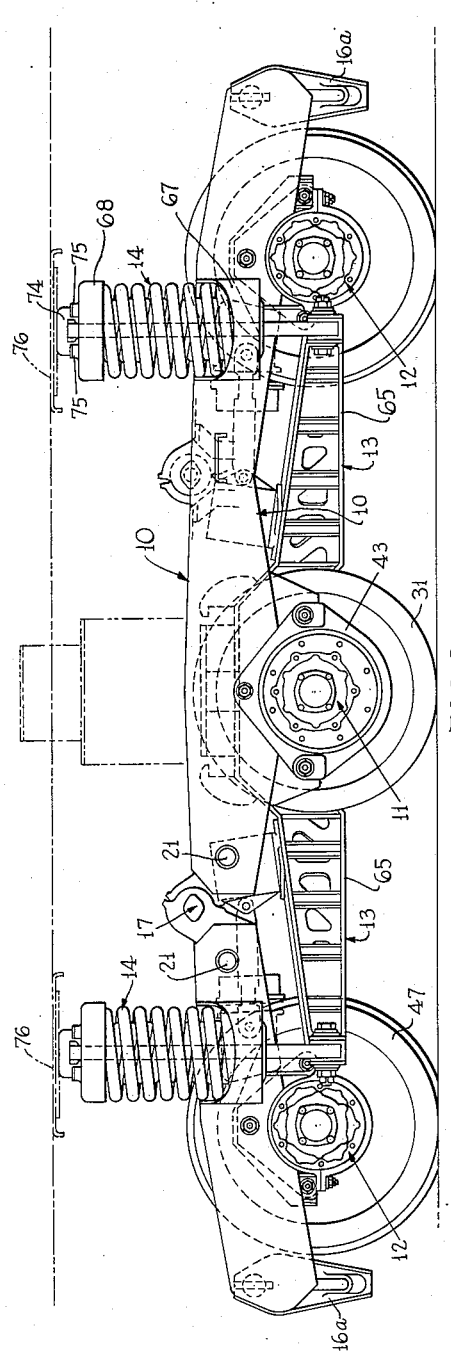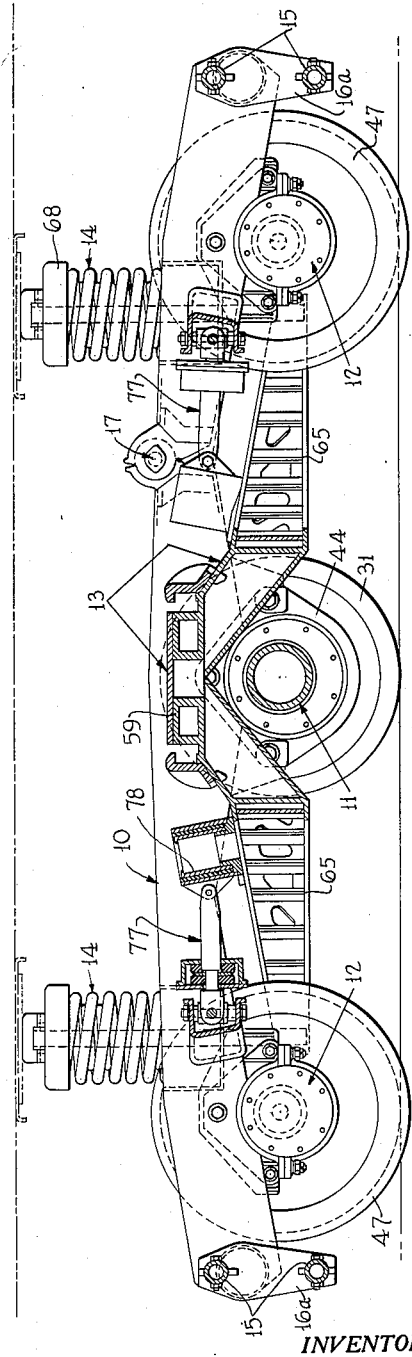

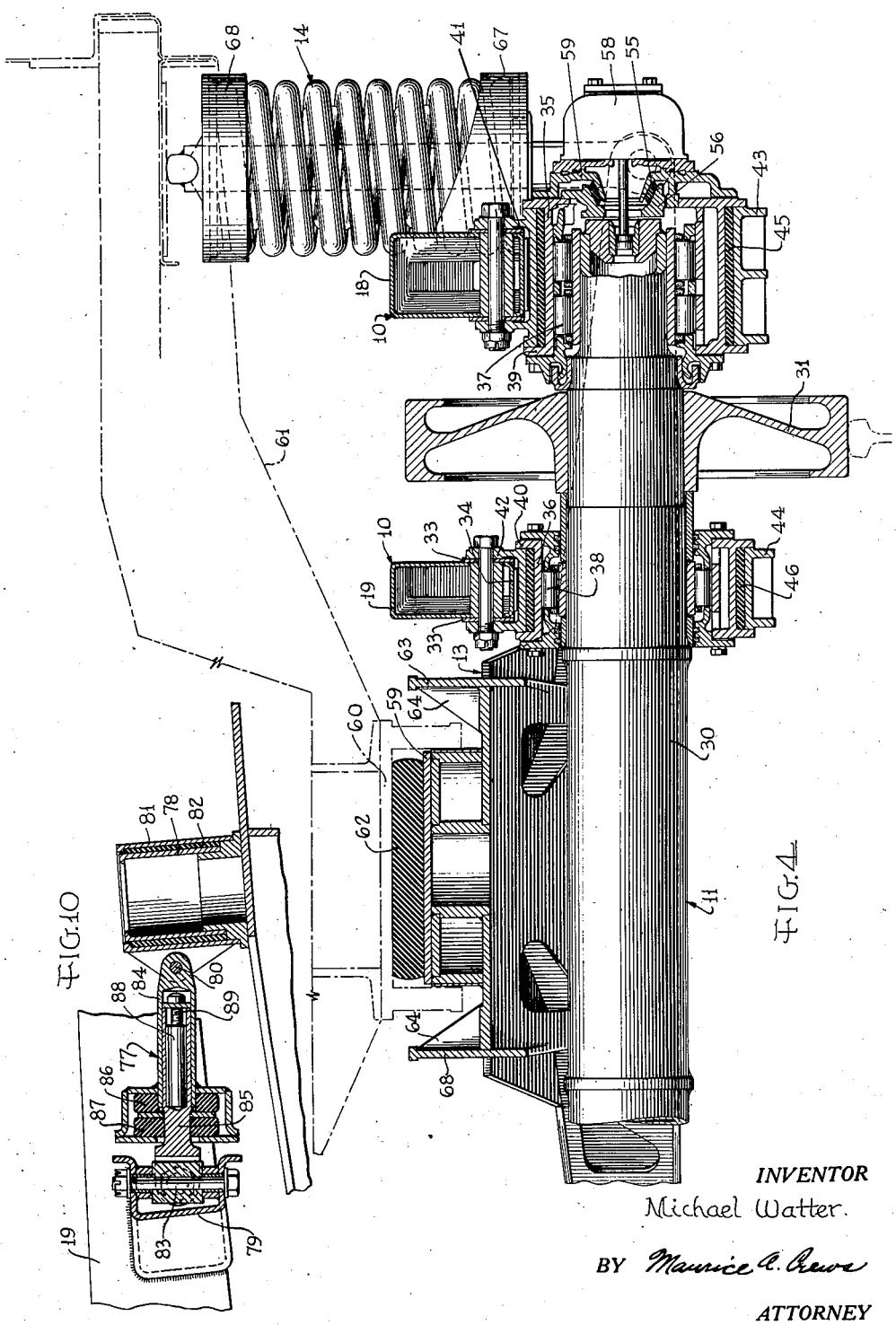

Dec. 9, 1952     M. WATTER     2,620,742
RAILWAY TRUCK

Filed April 24, 1947     5 Sheets-Sheet 4

INVENTOR
Michael Watter.

BY Maurice A. Crews
ATTORNEY

Dec. 9, 1952    M. WATTER    2,620,742
RAILWAY TRUCK
Filed April 24, 1947    5 Sheets-Sheet 5
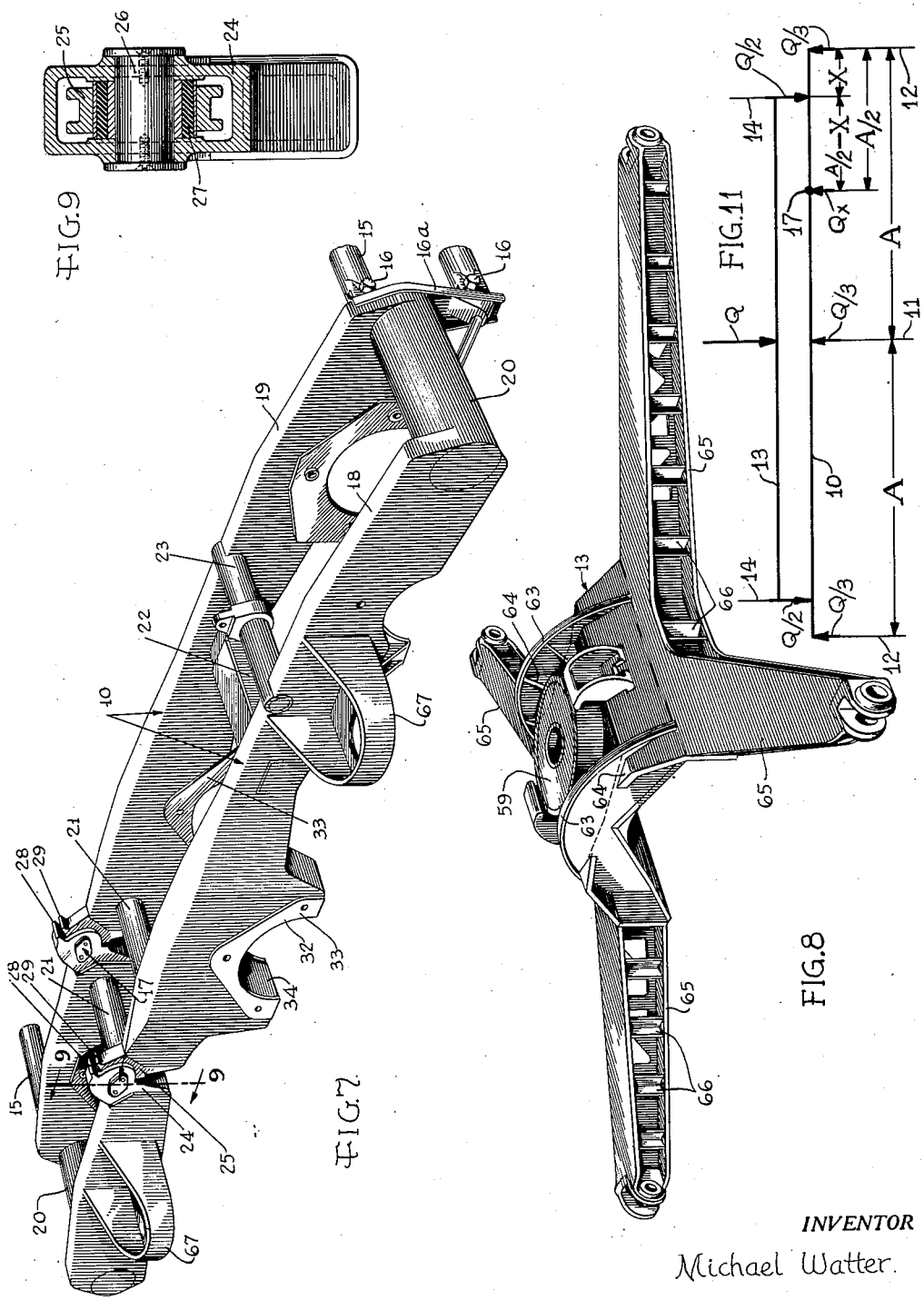
INVENTOR
Michael Watter.
BY Maurice A. Crews
ATTORNEY Patented Dec. 9, 1952

2,620,742

UNITED STATES PATENT OFFICE 2,620,742

RAILWAY TRUCK

Michael Watter, Philadelphia, Pa., assignor to The Budd Company, Philadelphia, Pa., a corporation of Pennsylvania Application April 24, 1947, Serial No. 743,637

8 Claims. (Cl. 105—180)

The invention relates to railway car trucks and more particularly such trucks especially adapted for use with passenger cars.

It is among the objects of the invention to provide a truck of this class which is relatively simple in construction, has a high strength-weight ratio and possesses easy riding qualities.

These and other objects and advantages and the manner in which they are attained will become evident from the following detailed description when read in connection with the drawings forming a part of this specification.

In the drawings,

Figure 1 is a plan view of the truck;

Figure 2 is a side elevational view of the same, showing in dot-and-dash lines the relation of a car body thereto;

Figure 3 is a central longitudinal vertical sectional view taken substantially along the line 3—3 of Fig. 1, certain parts not on this section line being broken away and shown in section;

Figure 4 is an enlarged fragmentary transverse vertical sectional view through the axis of the central axle as indicated by the line 4—4 of Fig. 1;

Figure 7 is a perspective view, as seen from the outside top, of one of the side frames of the truck;

Figure 8 is a similar view of the bolster spider;

Figure 9 is an enlarged detail sectional view, taken substantially on the line 9—9 of Figs. 1 and 7;

Figure 10 is an enlarged detail sectional view through one of the longitudinally extending restraining units connecting the bolster to the side frames; and Fig. 11 is a diagram illustrating the load distribution on one side of the truck.

Figure 5:
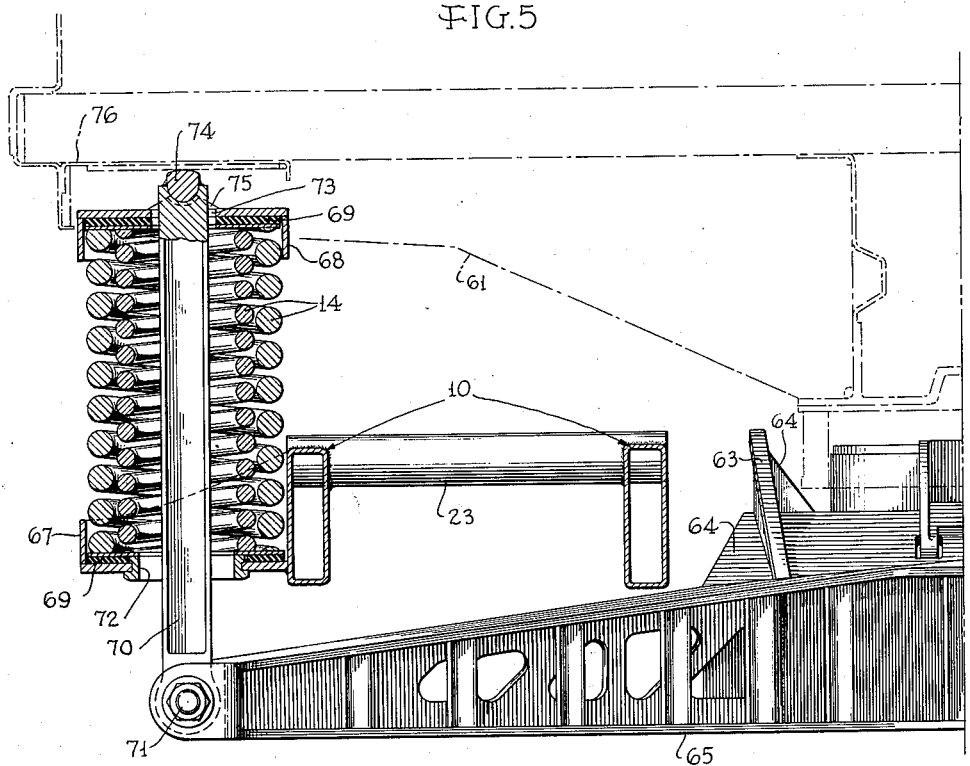
Figure 5 is a similar view through the spring suspension for the bolster, as indicated by the line 5—5 of Fig. 1.

The truck of the invention comprises the side frames 10, 10, a central wheel and axle assembly 11 interconnecting the central portions of the side frames and forming the main connection between them and end wheel and axle assemblies 12, one associated with each end of each side frame.

A bolster spider 13 is suspended by springs 14 from the side frames at points adjacent each of the end wheel and axle assemblies 12. The side frames may be further interconnected adjacent their ends by transverse vertically arranged pairs of members 15, 15 articulated to the side frames by the horizontal joints 16, 16 carried by vertical brackets 16a secured and braced to the side frames, see Fig. 7.

These constitute the principal parts of the truck providing, as shown in the drawings, a six wheel truck of exceedingly simple construction and having a low center plate. By having the central wheel and axle assembly extending through from side to side of the truck, not only does it serve to interconnect the side frames and maintain them in tram, but it also provides means for insuring the operation of the electrical track signals. By omitting the through-running axles at the ends of the truck and by utilizing the central axle as the main connection between the side frames, considerable weight is saved over prior six wheel trucks.

The side frames 10, in order to aid in distributing the load equally between the wheels, are articulated through a horizontal joint 17, which joint is disposed midway between the central wheel and axle assembly 11 and one of the end wheel and axle assemblies 12. As shown in Fig. 1 the joints 17 for the opposite side frames 10 are arranged on opposite sides of the vertical central plane of the truck.

Each side frame consists of two spaced longitudinally extending members 18, 19 which may be of light weight box section sheet metal construction, see Figs. 4 and 5, these members being strongly interconnected by transverse end members 20, and intermediate members 21, 21 arranged on opposite sides of the joint 17 and further intermediate members 22 and 23 which latter may also serve to support brake mechanism for the truck (not shown).

The detail of the joint 17 is clearly shown in Figs. 7 and 9 as comprising hinge brackets 24 and 25 strongly secured to the adjacent ends of the hinged portions of each side frame member 18 and 19, one of said brackets, as 24, being hollow to receive the end of the other within the hollow thereof. The brackets are connected by the hinge pin 26, and the joint is cushioned by a rubber bushing 27 to insure silent operation and avoiding the necessity of oiling the joints. Opposed abutments 28 and 29 on the respective brackets 24 and 25 limit the extent of the hinging movement between the parts.

The central wheel and axle assembly 11 comprises the through axle 30 on which the wheels 31 are press fitted in the usual manner. The wheels, as shown, are not flanged so that they can move laterally on the rails without hindrance. They are of a tread width sufficient to avoid leaving the rail on curves usually encountered in service.

It will be noted, see Figs. 1 and 9, that the central portions of the frame members 18 and 19 are laterally widened and vertically deepened for greater strength in this region where they are joined to the central wheel and axle assembly. In this region they are also formed with a downwardly open semicircular cylindrical opening 32 reinforced in its margins by side reinforcing plates 33 and in the opening between the side reinforcements, by a channel 34 conforming to the semicylindrical shape of the opening.

The axle 30 is mounted in the journal boxes 35 and 36 associated with members 18 and 19 respectively, in which the axle 30 is mounted through antifriction bearings 37 and 38. Each box is formed on its periphery with an outwardly facing channel 39 and 40 respectively. Semicylindrical bearing brackets 41 and 42, bolted to the respective members 18 and 19 fit the top half of the respective channels 39 and 40 and semicylindrical clamps 43 and 44, completing a cylindrical bearing with the respective bearing brackets 41 and 42, fit into the lower portions of the respective channels 39 and 40, when these clamps or lower bearing portions are bolted to the upper bearing brackets 41 and 42 in their margins, as shown in Figs. 2, 3 and 4. To cushion the mounting and to avoid transmission of high frequency vibrations, rubber sleeves 45 and 46 are provided in the spaces between the boxes 35 and 36 and their respective securing brackets.

With this arrangement, it will be seen that the axle 30 forms a strong interconnection between the side frames at the opposite sides of the trucks, yet allows each side frame to tilt freely about the axis of the axle 30, to follow track irregularities.

Figure 6:
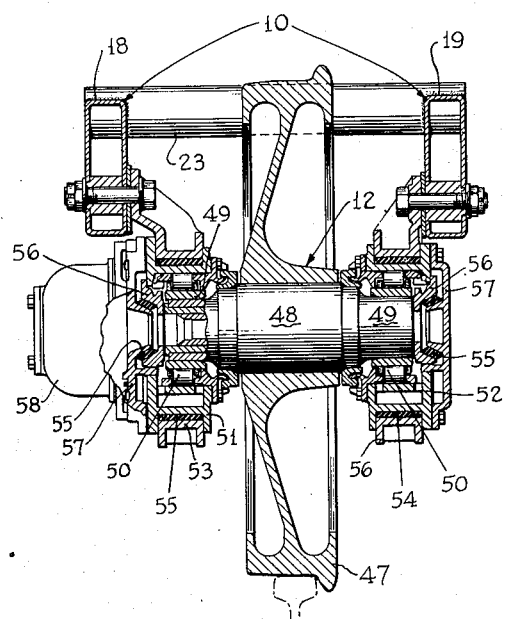
Figure 6 is an enlarged transverse vertical sectional view through the mounting of an end wheel of the truck, the section being taken substantially along the line 6—6 of Fig. 1.

The end wheel and axle assemblies 12 are each assembled with the side frames in the manner shown in Fig. 6. The wheel 47, which is a flanged wheel to guide the truck along the track, is press fitted on the short axle 48 having reduced ends 49, mounted through anti-friction bearings 50 in journal boxes 51 and 52 on the respective side frame members 18 and 19. The mounting of the journal boxes on the side frames is similar to the mounting of the central axle, split bearing brackets, as 53 and 54, embracing the respective journal boxes 51 and 52, with rubber bushings 54 and 55 interposed between the respective bearing brackets and boxes. The upper bearing bracket portion of brackets 53 and 54 overlaps and is securely bolted to the respective members 18 and 19, see Figs. 2, 3 and 6.

The axles 30 and 48 are mounted eccentrically in their journal boxes to provide ample space below the axles for an oil reservoir. Endwise movement of the axles, 30 and 48, is cushioned by rubber sleeves partly in shear and partly in compression interposed between a thrust bearing plate 56 and a closing cap 57 on the outer end of the respective journal boxes. In the case of the outboard closing plate of the outboard journal boxes 35 and 51, it is modified to mount a wheel slide detector 58 which forms no part of the present invention.

The bolster and the manner of its suspension from the side frames so as to distribute the loads equally to the wheels will now be described.

The bolster 13 consists of a spider having a central portion carrying the center plate 59 raised sufficiently above the center axle 30 to allow the free vertical springing movement thereof. The center plate 59 is adapted to receive the mating center plate 60 of the body 61 with a suitable cushion pad 62 inserted between them, see Fig. 4. This central portion of the bolster is a hollow structure formed by welding plates together and is suitably reinforced by longitudinally and transversely extending braces, as 63 and 64. From this central portion radiate four arms 65 of substantially equal lengths, as shown, and extending outwardly under the side frames 10 and terminating adjacent the respective end wheels 47.

These arms are of progressively decreasing section toward their ends and are, for the sake of lightness not inconsistent with strength, of generally I-beam section, with the web of the beam provided with lightening holes and with spaced vertical reinforcements 66 stiffening the beam.

To provide for equal loading of the wheels, each spider arm is supported at its end at a point on the frame spaced one-sixth of the distance between the center axle 30 and adjacent axle 48, as will now be explained by means of diagram Fig. 11.

In this diagram, line 10 represents one of the side frames, 17 the joint in said frame, 11 and 12 the respective locations of center and end wheels, 13 the bolster, 14 the locations of the springs supporting bolster 13 on side frame 10, A the distance between wheel locations 11 and 12, Q the total load transferred by bolster 13 to one side frame 10, X the distance between end wheel location 12 and spring location 14, and $Q_x$ the vertical force at joint 17.

From statements made hereinbefore, it follows that the vertical load at spring location 14 is $Q/2$, that the vertical support at each wheel location 11 and 12 is $Q/3$, and that the distance between joint 17 and end wheel location 12 is $A/2$.

This leads, applying the laws of the lever, to the following equations:

$$Q_x + Q/3 = Q/2$$
$$Q_x = Q/6$$
$$XQ/3 = Q_x(A/2 - X)$$
$$XQ/3 = Q/6(A/2 - X)$$
$$X = A/6$$

The suspension details of the spider arms from the adjacent side frames is the same for each arm, and one such suspension will now be described in connection with Figs. 2 and 5.

A bottom spring receiving and locating cup 67 is strongly secured to the outboard face of the outer member 18 of the side frame. The lower end of the coil spring 14, which is shown as a pair of internested coil springs, is held positioned by this cup. The upper end of the spring is held positioned in an upper cup 68 and, to avoid vibration transmission, the ends of the springs are seated on rubber cushion sandwiches 69 at top and bottom.

A swing hanger 70, whose lower end is pivoted to the bolster arm 65 by a longitudinally extending pivot 71 extends upwardly through an opening 72 in the bottom cup 67, which opening is enlarged to allow the desired relatively free lateral swinging movement of the bolster. The upper end of the swing hanger extends through a hole 73 in the upper cup 68 and has secured to it a transverse member 74 forming trunnions seated on corresponding bearing seats 75 formed on the cup and arranged longitudinally on opposite sides of the swing hanger 70, see Fig. 2.

With this arrangement, since the top and bottom of the springs are held by the cups 67 and 68, lateral movement of the bolster tends to distort the springs 14 and they will thus interpose an increasing resistance to such swinging movement, but impose relative small resistance to the initial swinging. The springs 14, by their reaction, also return the bolster to the central position after the force which caused its lateral movement has been removed.

With the arrangement of bolster suspension disclosed, it is a simple matter to utilize the suspension to serve as side bearings for the car body. As shown in Fig. 5, the member 74 may be flattened somewhat on its top face, and side bearings, as 76, may be provided on the car body 61 at the location of each of the springs, so that they are in position to slidingly engage the top of the swing hanger members 74 associated with each spring location.

The longitudinal forces between the bolster and side frames are transmitted, as shown in Fig. 1, by four restraining units, generally designated 77, one associated with each arm of the bolster. Since the construction of these units is the same and they are similarly connected to the bolster and side frames, only one need be described in detail, and reference is made in this connection to Fig. 10.

The restraining unit 77 is shown connected between a generally vertically extending cylindrical bracket 78 secured to the adjacent bolster arm 65 and a laterally extending bracket 79 secured to the adjacent side frame member 19. In order to permit the relative vertical springing movement and lateral swing movement of the bolster with a minimum of restraint the one end of the unit is connected by a horizontal pivot 80 to a sleeve 81 mounted through a rubber bushing 82 on the bracket 78, while the opposite end of unit 77 is connected by a universal joint 83 to the bracket 79. The unit proper comprises two telescoping members 84 and 85 whose relative endwise movement is cushioned by rubber cushions, 86 and 87, one compressed in one direction of relative movement and the other in the other directoon. The yielding unit thus serves not only to allow relatively free vertically springing movement and transverse swinging movement of the bolster 13 but it also acts to cushion the longitudinal forces and dampen high frequency vibrations.

In the lateral movement of the bolster the rubber sleeve surrounding the cylindrical bracket 78 is placed in torsional shear to aid in checking the lateral movement. Each of the units is also provided with a rubber pad 88, see Fig. 1, which is in position to engage the adjacent side frame member 19 and form a cushioned stop for excessive lateral movement of the bolster. Means, as 89, are provided for initially adjusting the telescoping action of the units 77.

The four units 77 are thus seen to provide effective means for transmitting and cushioning the longitudinal forces between the bolster 13 and the side frames 10, while allowing relative transverse and vertical movements between them and acting in a lesser degree to cushion these movements.

In the foregoing specification, a specific form of the invention has been described in detail, but it will be understood that changes and modifications may be made by those skilled in the art without departing from the main features of the invention, and such changes and modifications are intended to be covered in the appended claims.

What is claimed is:

1. In a six wheel railway truck, side frames articulated between their ends, a wheel and axle assembly interconnecting the central portions of said side frames, and end wheels supporting the ends of said side frames, the articulation in the respective side frames being disposed about midway between the axis of said assembly and the axis of one of said end wheels, and a bolster having four points of support from the side frames at substantially equal distances from its center plate, said points of support being located on the side frames adjacent each of the end wheels and spaced therefrom about one-sixth of the distance between the axis of an end wheel and the axis of the adjacent wheel of said assembly.

2. In a six wheel railway truck, side frames each comprising spaced transversely interconnected longitudinally extending members and each articulated between its ends, a wheel and axle assembly having its ends rotatably mounted in the respective spaced longitudinally extending members of said side frames and serving as a transverse connection between them, the wheels of said assembly being disposed in the space between said spaced longitudinal members of the respective side frames, and end wheels each having an independent journalled connection adjacent the ends of the respective side frames and also being disposed in said space, the articulation of said side frames being disposed approximately midway between the wheels of said assembly and one of the end wheels of the respective side frames.

3. In a six wheel railway truck, side frames each comprising spaced transversely interconnected members and each articulated between its ends, a wheel and axle assembly having its ends rotatably mounted in the respective spaced longitudinally extending members of said side frames and formed as a main transverse connection between them, the wheels of said assembly being disposed in the space between said spaced longitudinal members of the respective side frames, and end wheels supporting the ends of said side frames and also disposed in said space.

4. In a six wheel railway truck, side frames articulated between their ends, a wheel and axle assembly journalled in said side frames and forming a transverse connection between the central portions of said side frames, end wheels each having short independent axles journalled adjacent the ends of the respective side frames, and transverse end connections between the adjacent ends of said side frames and pivotally connected thereto.

5. In a six wheel railway truck, side frames articulated between their ends, a wheel and axle assembly journalled in, and transversely interconnecting, the central portions of said side frames, end wheels each having short independent axles journalled adjacent the ends of the respective side frames, said side frames being articulated between the wheels of said assembly and the end wheel at one end of the respective frames, and a bolster having four points of spring support from said side frames adjacent to, but some distance inwardly of, each of the respective end wheels and approximately equally spaced from the center plate of the bolster.

6. In a six wheel truck, side frames articulated between their ends, a wheel and axle assembly interconnecting the central portions of said side frames, end wheels supporting the ends of the respective side frames, the articulation in the respective side frames being disposed midway between the wheels of said assembly and one of the end wheels, and a bolster spring-supported from said side frames at equal distances from its center plate and at points located adjacent each of said end wheels and spaced longitudinally from the adjacent end wheel one-sixth of the distance between it and the adjacent wheel of said assembly.

7. In a railway truck, spaced longitudinally extending side frames, a transverse member interconnecting said side frames, and a bolster having a center plate and supported from said side frames for vertical and lateral movement with respect thereto, said support comprising coil springs seated at their lower ends in spring seats secured to said side frames, swing hangers pivoted to the bolster at their lower ends and extending upwardly through enlarged openings in the respective lower spring seats and through the associated coil spring and supported at their upper ends by a pivotal connection to the top of an associated upper spring seat, the upper ends of said swing hangers serving as side bearings for cooperation with side bearings on a body supported on said bolster center plate.

8. In a railway truck, spaced longitudinally extending side frames, a transverse member interconnecting the side frames, and a bolster having a center plate and supported from said side frames, said support comprising springs seated on said side frames and extending thereabove and above the bolster center plate, and swing hangers supporting the bolster from said springs, the upper ends of said swing hangers serving as side bearings for cooperation with side bearings on a body mounted on the bolster center plate.

MICHAEL WATTER.

REFERENCES CITED

The following references are of record in the file of this patent:

UNITED STATES PATENTS

| Number | Name | Date |
|---|---|---|
| 608,983 | Hansen | Aug. 9, 1898 |
| 738,840 | Peckham | Sept. 15, 1903 |
| 1,265,374 | Pilcher | May 7, 1918 |
| 1,512,599 | Hedgcock | Oct. 21, 1924 |
| 1,542,868 | Gibson | June 23, 1925 |
| 2,258,663 | Travilla et al. | Oct. 14, 1941 |
| 2,268,267 | Sheesley | Dec. 30, 1941 |